US011625269B1

(12) United States Patent
Geva et al.

(10) Patent No.: US 11,625,269 B1
(45) Date of Patent: Apr. 11, 2023

(54) SCHEDULING FOR LOCALITY OF REFERENCE TO MEMORY

(71) Applicant: Amazon Technologies, Inc., Seattle, WA (US)

(72) Inventors: Robert Geva, Cupertino, CA (US); Taylor Goodhart, Snohomish, WA (US); Ron Diamant, Santa Clara, CA (US); Preston Pengra Briggs, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 198 days.

(21) Appl. No.: 17/301,343

(22) Filed: Mar. 31, 2021

(51) Int. Cl.
*G06F 9/48* (2006.01)
*G06F 8/41* (2018.01)
*G06N 3/063* (2006.01)
*G06F 7/24* (2006.01)

(52) U.S. Cl.
CPC ............... *G06F 9/4881* (2013.01); *G06F 7/24* (2013.01); *G06F 8/433* (2013.01); *G06N 3/063* (2013.01)

(58) Field of Classification Search
CPC .......... G06F 9/4881; G06F 7/24; G06F 8/433; G06N 3/063
See application file for complete search history.

(56) References Cited

U.S. PATENT DOCUMENTS

| 2007/0124568 | A1* | 5/2007 | Kra | G06F 12/0859 |
| | | | | 712/226 |
| 2007/0255909 | A1* | 11/2007 | Gschwind | G06F 12/0269 |
| | | | | 711/170 |
| 2011/0154236 | A1* | 6/2011 | Stoeck | G06F 3/048 |
| | | | | 715/764 |
| 2016/0210080 | A1* | 7/2016 | Frank | H04L 67/1097 |

OTHER PUBLICATIONS

Yoav Etsion et al., "Task Superscalar: An Out-of-Order Task Pipeline", [Online], pp. 89-100, [Retrieved from Internet on Dec. 3, 2022], <https://ieeexplore.ieee.org/stamp/stamp.jsp?tp=&arnumber=5695528> (Year: 2010).*

Sohan Lal et al., "SYCL—Bench: A Versatile Cross-Platform Benchmark Suite for Heterogeneous Computing", [Online], pp. 1-16, [Retrieved from Interent on Dec. 3, 2022], <https://www.cosenza.eu/papers/LalEUROPAR20.pdf> (Year: 2020).*

* cited by examiner

*Primary Examiner* — Ziaul A Chowdhury
(74) *Attorney, Agent, or Firm* — Weaver Austin Villeneuve & Sampson LLP

(57) ABSTRACT

A technique for scheduling instructions includes obtaining a set of instructions that operate on memory objects, and determining the dependencies of the memory objects. The memory objects are then sorted into a sequence of memory objects based on the dependencies of the memory objects, and the set of instructions are scheduled into a sequence of instructions according to the sequence of memory objects. Sorting memory objects allows instructions that operate on the same memory object to be kept together. This helps (Continued)

minimize spilling conditions because intervening instructions that do not operate on the same memory object can be avoided.

20 Claims, 12 Drawing Sheets

```
MemA[0-31] = inst1
MemB[0-63] = inst2(MemA[16-31])
MemA[32-63] = inst3
MemA[64-95] = inst4
MemC[0-63] = inst5(MemA[0-63])
MemA[96-127] = inst6
MemD[0-31] = inst7(MemB[32-63])
MemD[32-63] = inst8(MemC[0-31])
MemE[0-63] = inst9(MemC[32-63])
MemF[0-31] = inst10
MemE[64-127] = inst11(MemD[16-31])
MemF[32-47] = inst12(MemF[0-16])
MemF[48-95] = inst13(MemC[16-31])
MemG[16-31] = inst14(MemD[0-7])
MemG[0-15] = inst15(MemE[0-63])
MemG[32-48] = inst16(MemF[0-96])
...
```

Sequence of memory objects: { A, B, C, D, E, F, G }

| Mem | Instructions Writing to Mem |
|---|---|
| A | inst1, inst3, inst4, inst6 |
| B | inst2 |
| C | inst5 |
| D | inst7, inst8 |
| E | inst9, inst11 |
| F | inst10, inst12, inst13 |
| G | inst14, inst15, inst16 |

Seqeunce of instructions:
{ inst1, inst3, inst4, inst6, inst2, inst5, inst7, inst8, inst9, inst11, inst10, inst12, inst13, inst14, inst15, inst16 }

SCHEDULING FOR LOCALITY OF REFERENCE TO MEMORY

BACKGROUND

A compiler is a software tool that interprets programming code, and generates machine instructions suitable for execution on a computing device to implement the objective of the programming code. In addition to generating instructions, a compiler may also include a scheduler to schedule and distribute the generated instructions to different execution engines of the computing device.

BRIEF DESCRIPTION OF THE DRAWINGS

Various embodiments in accordance with the present disclosure will be described with reference to the drawings, in which.

DETAILED DESCRIPTION

Figure 1:
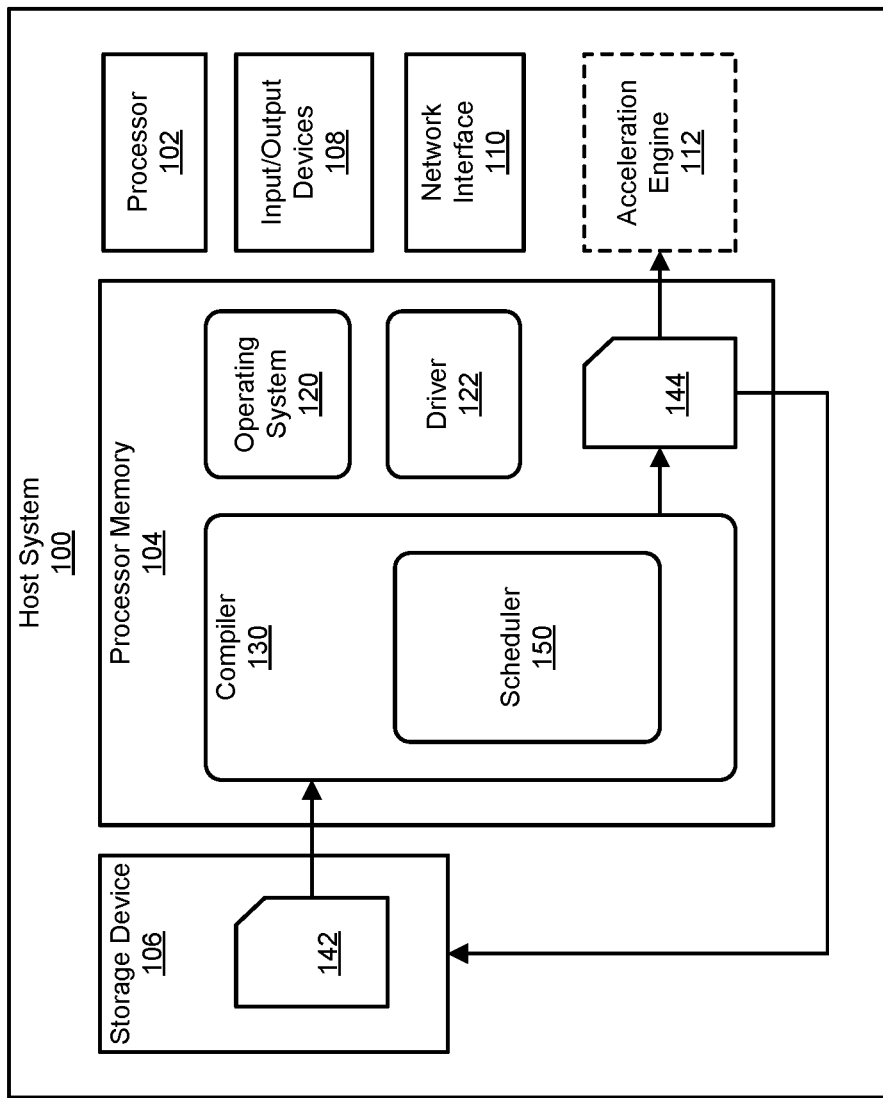
FIG. 1 illustrates a block diagram of an example of a host system including a compiler.

Compiler optimizations may involve trading off between resource allocation and instruction scheduling. An allocator is a component of the compiler that assigns physical resources (e.g., registers, physical memory, etc.) to virtual resources referenced and used by the instructions. However, resource assignments can create anti-dependencies. A scheduler that runs after the allocator is limited by these anti-dependencies. For example, when the same physical resource (e.g., a register or physical memory) has been allocated to a read instruction that reads a value from the physical resource and a write instruction that writes a value to the physical resource, the read instruction has to be scheduled before the write instruction. This is done to ensure the read instruction reads the correct value from the physical resource before being over-written by the write instruction. Although the two instructions are not otherwise dependent on each other, allocating the same physical resource to both instructions forces the read instruction to be scheduled before the write instruction. A scheduler that runs before the allocator is not limited by the anti-dependencies created by the allocator, and therefore has more freedom to move and rearrange the order of instructions. However, scheduling instructions before resource allocation can lengthen the lifetimes of the virtual resources, and make it more difficult for the allocator to assign physical resources to the virtual resources. This often results in more spilling in which data is moved back and forth from local memory to system memory, and leads to longer data latency and slower code execution.

Spilling is exacerbated in hardware architectures that have limited physical resources as compared to the amount of data to be processed simultaneously. For example, in a neural network accelerator, the storage capacity of the on-chip buffer memory can be limited as compared to the size of tensors that the neural network operates on. An inefficient assignment of the buffer memory may result in some memory locations being taken up by data that are not involved with current calculations being performed by the accelerator. This can cause unnecessary spilling where intermediate results have to be written out to system memory to make space in the accelerator to perform additional calculations. Subsequently, the intermediate results have to be read back from system memory to complete the calculations. The writes and reads to system memory can increase the data latency of the neural network and reduce system throughput. As such, avoidance of spilling and efficient allocation of memory resources can improve performance of executing a neural network on a given hardware architecture.

The techniques disclosed herein provide an efficient and effective mechanism to schedule instructions in a pre-scheduler by sorting memory objects that the instructions operate on. The dependencies of the memory objects can be determined based on which memory objects the instructions read from and write to. The memory objects can be sorted into a sequence of memory objects based on their dependencies, and the instructions can be scheduled according to the sequence of memory objects. In contrast to schedulers that sort instructions, sorting memory objects allows instructions that operation on the same memory object to be kept together. This helps minimize spilling conditions because intervening instructions that do not operate on the same memory object can be avoided. Moreover, by sorting memory objects instead of instructions, the data set that the pre-scheduler has to arrange in a sequence can be significantly smaller than the total number of instructions. This can improve the speed of the scheduling processes and reduce compilation time. Furthermore, the memory object dependencies determined by the pre-scheduler can be readily provided to an allocator to assign physical memory to the memory objects. This allows both the allocator and the pre-scheduler to operate on the same construct (memory objects) to improve efficiency of the allocator by eliminating the need to translate between instructions and memory objects during the allocation process.

In the context of neural networks, there can be millions of instructions to schedule, and the instructions may utilize tens of thousands of memory objects. A neural network accelerator may perform matrix-multiply operations by reading operands from a state buffer, using an array of processing engines (e.g., a systolic array) to perform a multiply-and-accumulate calculation in each processing engine, and then writing the results to a result buffer. Some hardware architectures may implement constraints in which instructions executed for different accumulation groups do not interleave with each other. This may require keeping all instructions that write to the same memory object in consecutive order. The techniques disclosed herein automatically satisfy such constraints while achieving the objective of minimizing spills by scheduling memory objects instead of scheduling instructions directly. As such, the techniques disclosed herein can easily scale to the millions of instructions used in complex neural networks.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

FIG. 1 illustrates a block diagram of an example of a host system 100 on which a compiler 130, such as is described herein, can run. The illustrated host system 100 is an example of a computing device, and includes a processor 102, a processor memory 104, at least one storage device 106, various Input/Output (I/O) devices 108, and at least one network interface 110. In the example of FIG. 1, the host system 100 also includes an acceleration engine 112, which is an integrated circuit device that can accelerate certain operations or computations performed by the host system 100. In various examples, the host system 100 can be implemented as a server in a data center, a desktop computer, a laptop computer, a tablet computer, or a smartphone, among other examples. In some examples, operations or components discussed below as being performed or included in the host system 100 can be performed or included in other computer devices. For example, the compiler 130 can execute on the host system 100 while the acceleration engine 112 is located at a different host system.

The processor 102 is an integrated circuit device that can execute program code, in the form of instructions. The program code can be for various software applications or tools, such as an operating system 120 or the illustrated compiler 130. While the processor 102 is executing a program, the instructions for the program can be stored in the processor memory 104. The instructions can also be stored elsewhere, such as on the storage device 106, and can be loaded into the processor memory 104 when needed by the processor 102. The processor 102 can also use the processor memory 104 for temporary storage of other data on which the processor 102 is operating. In various examples, the processor memory 104 is a volatile memory type, such as a type of random access memory, though non-volatile memory types can, alternatively or additionally, be used for the processor memory 104.

The storage device 106 is an example of a device that can include non-volatile memory. For example, the storage device 106 can be a magnetic disk drive, a solid-state drive, or an optical drive, among other examples. The storage device 106 can further be non-transitory, such that program code and other data stored on the storage device 106 remains present when the storage device 106 is not powered on.

The storage device 106 is one example of a peripheral device, which are components that can be coupled to the host system 100 to add functionality to the host system 100. Other examples of peripheral devices include the Input/Output devices 108 and the network interface 110. The Input/Output devices 108 can include user input and output devices, such as keyboards, mice, touch screens, microphones, display screens, speakers, printers, and scanners, among other examples. The network interface 110, which can be implemented using a network interface card, can provide access to one or more networks. The network interface 110 can include, for example, a physical port for connecting a network cable and/or wireless antennas for communicating with Wi-Fi and/or cellular networks. The network interface 110 can also be described as an I/O device.

The acceleration engine 112 is also another type of peripheral device or I/O device. The acceleration engine 112 is a device that is purpose-built to perform certain operations that can be performed by the processor 102, but can be performed faster by the acceleration engine 112. For example, the acceleration engine 112 can be a neural network accelerator, and, as such, may be able to perform the large scale, parallel computations of a neural network more efficiently than when the computations are performed by the processor 102. As another example, the acceleration engine 112 can be a graphics processing unit (GPU), and may be optimized to perform the computations needed for graphics rendering. Other examples of devices that can be implemented by the acceleration engine 112 include cryptographic accelerators, compression and decompression accelerators, 3-D accelerators, regular expression accelerators, security accelerators, and others.

In various examples, the acceleration engine 112 can execute program code to perform certain operations. For example, when the acceleration engine 112 is a neural network accelerator, the acceleration engine 112 can be programmed to execute a particular neural network, such as one that performs image recognition or one that performs machine translation. As a further example, to support the execution of a neural network, the acceleration engine 112 can be programed to perform operations such as copying data for the neural network from processor memory 104 (for example) into the acceleration engine 112, copying input data for the neural network from processor memory 104 into the acceleration engine 112, and/or copying results from the acceleration engine 112 into the processor memory 104, among other examples.

To generate program code for the acceleration engine 112, in various examples, the host system 100 can execute the compiler 130. Compilers, in general, are software programs that translate program code written in a human-readable language into a format (e.g., machine instructions) that can be read and processed by an integrated circuit device. In the example of FIG. 1, the acceleration engine 112 is a neural network accelerator and the compiler 130 is for compiling a neural network description into instructions to be executed by the acceleration engine 112. When the acceleration engine 112 implements a different type of accelerator, another compiler can be used.

The compiler 130 can be activated, for example, when the operating system 120 receives keyboard, mouse, touch-screen, voice commands, or other inputs from the Input/Output devices 108. The inputs can further include parameters for the compiler 130, such as the input code 142 to compile and configuration options for the compilation process. Once the compiler 130 is activated, the processor 102 can load the instructions for the compiler 130 into the processor memory 104, and can execute the instructions.

In the example of FIG. 1, the compiler 130 can perform various operations to produce compiled code 144. Compiler 130 can receive and process input code 142. The input code 142 can describe a program in a high-level programming language, such as Java, C++, or TensorFlow™, among many other examples. The input code 142 can describe, for example, steps to perform image recognition, speech recognition, machine translation, or other operations. The input code 142 can be obtained, for example, from the storage device 106. Alternatively, though not illustrated here, the input code 142 may be located in the processor memory 104 or can be obtained from a network location, using the network interface 110. Processing of the input code 142 can include sorting the operations described in the input code 142 into layers, where the outputs of one layer provide the inputs to a next layer. Processing can also include identifying steps to be performed by the processor 102, rather than by the acceleration engine 112. For example, the processor 102, through the execution of a driver 122, may need to perform steps such as configuring Direct Memory Access (DMA) descriptors for moving data into or out of the acceleration engine 112, among other examples.

In some implementations, the operations performed in any one layer, or at any one node in a layer, may be too many for the acceleration engine 112 to perform at the same time. The acceleration engine 112 may, for example, have a limited amount of local storage space for the data needed for a computation, or the computations may be more than the acceleration engine 112 can perform at one time. Compiler 130 may break the operations of a layer or node down into smaller operations, which can fit into the acceleration engine's local memory and/or can fit into the computing capacity of the acceleration engine 112. Compiler 130 also performs other steps, such as using a scheduler 150 to schedule or determine the order in which the acceleration engine 112 and/or processor 102 will perform operations, among other examples.

In various examples, the order of the steps to be performed by components of the acceleration engine 112 can be represented, for example, as a data flow graph, where the nodes in the graph represent memory operations, computations, and/or other operations, and the edges or connections between the nodes represent dependencies between the nodes, such as data dependencies, memory dependencies, or operational dependencies, among other examples. Additional optimization steps performed by compiler 130 can include, for example, removing redundant dependencies, resolving or handling dependencies between nodes by inserting synchronization instructions into the code, identifying possibly optimizations in memory usage or memory bandwidth usage, and other operations.

The output of compiler 130 is compiled code 144, which may include machine instructions in binary format. In some examples, the compiled code 144 can be stored in the processor memory 104. Alternatively or additionally, the compiled code 144 can be copied to the storage device 106 or to a network location. As noted above, the acceleration engine 112 may be located at a different host system, in which case the compiled code 144 can be sent over the network interface 110 to the other host system.

In the example of FIG. 1, the host system 100 can be executing a driver 122, which can also be referred to as a device driver or runtime driver, that manages the acceleration engine 112. The driver 122 can provide an interface between applications executing on the host system 100 (or on another host system) and the acceleration engine 112. For example, the driver 122 can provide an Application Program Interface (API) that defines functions for feeding input data to the acceleration engine 112 and defining the operation to perform on the input data. In this and other examples, the driver 122 can configure the acceleration engine 112 to perform the operation. For example, the driver 122 can identify a neural network that the acceleration engine 112 is to execute, as well as the location in the processor memory 104 or on the storage device 106 where the compiled code 144 for the neural network is located. The driver 122 can further load into the acceleration engine 112 or cause the acceleration engine 112 to load the compiled code 144, can load or cause the acceleration engine 112 to load the input data on which the neural network is to operate, and/or can cause the acceleration engine 112 to being executing on the input data. Once the acceleration engine 112 has finished, the acceleration engine 112 can notify the driver 122, and the driver 122 can deliver a result back to the application that requested the result.

Figure 2:
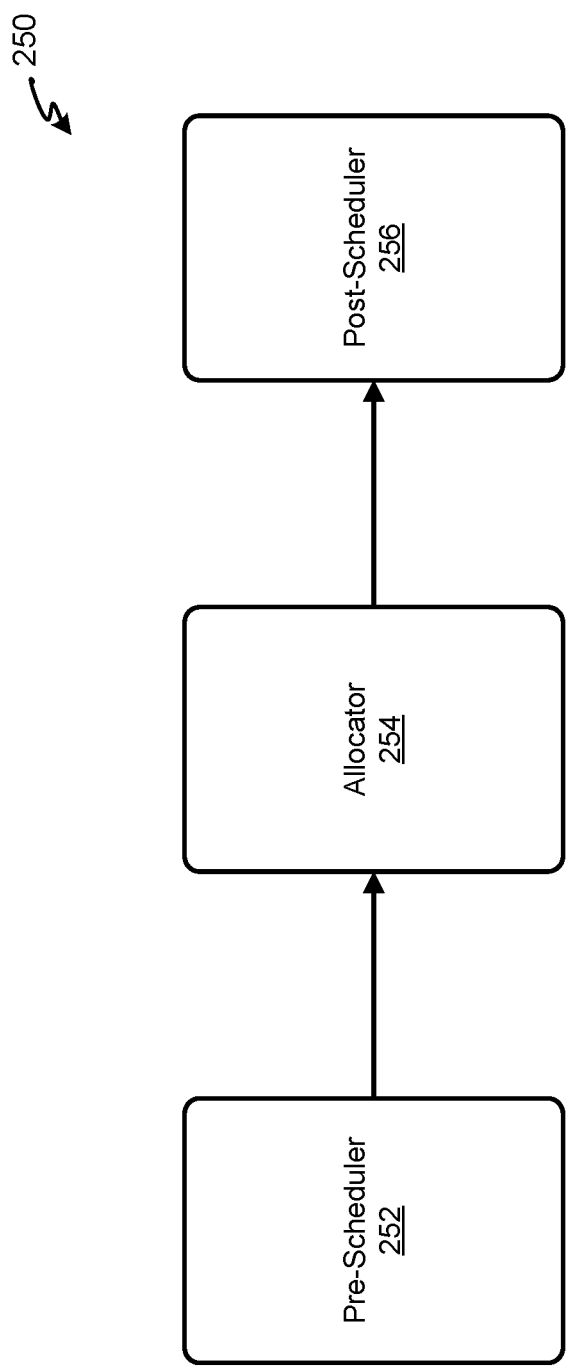
FIG. 2 illustrates a block diagram of an example of different phases of a compiler.

FIG. 2 includes a block diagram of an example of different compiler phases 250 that can be implemented in a compiler, according to some implementations. The compiler phases 250 may include a pre-scheduler 252, an allocator 254, and a post-scheduler 256. One purpose of the pre-scheduler 252 is to schedule producers of data close to their consumers in order to shorten the lifetimes of memory resources and alleviate the pressure on allocator 254. As such, pre-scheduler 252 may not necessarily address concerns such as optimal utilization of execution units. Instead, pre-scheduler 252 is used to schedule memory usage in a manner to avoid spilling.

Pre-scheduler 252 may obtain a set of instructions that operate on memory objects. The set of instructions can be machine instructions that the compiler derived from input code, and each instruction can be represented in terms of a memory object that the instruction writes to. Pre-scheduler 252 can determine all the dependencies between the memory objects, and sort the memory objects into a sequence based on the dependencies of the memory objects. For example, for an ordered pair of instructions in which a first instruction writes to a first memory object that is read by a second instruction, the second instruction is deemed to be dependent on the first instruction. If the second instruction writes to a second memory object, then that second memory object is considered to be dependent on the first memory object. The memory objects can be sorted into a sequence such that a second memory object that depends on a first memory object is arranged to be after the first memory object. Once the sequence of memory objects is established based on their dependencies, the set of instructions can be scheduled according to the sequence of memory objects such that instructions writing to a second memory object that depends on a first memory object are arranged to be after instructions that write to the first memory object.

Next, allocator 254 may assign physical memory to the memory objects referred to by the instructions processed by pre-scheduler 252. For example, pre-scheduler 252 may provide the sequence of memory objects to allocator 254 such that allocator 254 can assign physical memory addresses to the memory objects in a way that minimizes spills. It should be noted that it is not necessary to assign a contiguous address range to a memory object, and that each memory object can be assigned a set of address ranges. Finally, the post-scheduler 256 may perform the inverse operation of the pre-scheduler 252 by scheduling independent operations between a data load instruction and an instruction consuming that data to hide the load latency. The reordering of instructions performed by the post-scheduler 252 can be constrained by the sequence of memory objects (anti-dependencies) such that instructions writing to the same memory object are kept together in a group, but the ordering of instructions within the group can be rearranged.

Figures 3, 4:
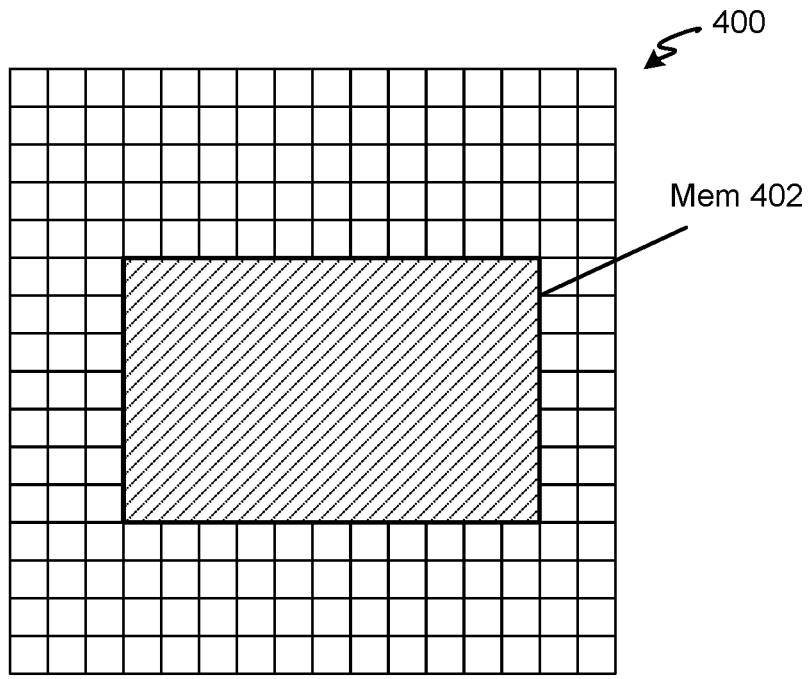
FIG. 3 illustrates an example of a set of instructions.
FIG. 4 illustrates a conceptual diagram of an example of a memory object.

FIG. 3 illustrates an example of a set of instructions 300 that a pre-scheduler can operate on. For ease of explanation, the set of instructions 300 includes sixteen instructions inst1 to inst16. However, it should be understood that the pre-scheduler can operate on any number of instructions, and that the set of instruction may include thousands or even millions of instructions, for example, when implementing a neural network.

As shown in FIG. 3, each instruction in the set of instructions 300 can be represented in terms of a write to a memory object. Some instructions may read from a memory object and write to a memory object, and the memory object for the write and read operations can be the same or different memory objects. Some instructions may write to a memory object without having to read data from a memory object. Furthermore, each instruction may read or write only a portion of a memory object or an entirety of a memory object, and the amount of data being read need not be the same as the amount of data being written. Different instructions may operate on different portions of the same memory object, and the different portions may overlap in certain sections or may not overlap at all. Moreover, different memory objects can be of the same or different sizes. To illustrate reading and writing to a portion of a memory object, each reference to a memory object (denoted as "Mem") shown in FIG. 3 includes an index range in brackets indicating the indices in the memory object that is being operated on. Each index of a memory object may refer to an addressable unit of data in the memory object (e.g., a byte, a data word, etc.), a group of addressable units (e.g., a doubleword or multiple number of data words), or an individual data element being stored in the memory object, etc. Each index of a memory object can have one or more instructions that write to that index, and/or have one or more instructions that read the particular index.

By way of example, instruction inst1 does not read from a memory object, but writes into indices [0-31] of memory object A; instruction inst2 reads from indices [16-31] of memory object A, and writes into indices [0-63] of memory object B; instruction inst3 does not read from a memory object, but writes into indices [32-63] of memory object A; instruction inst4 does not read from a memory object, but writes into indices [64-95] of memory object A; instruction inst5 reads from indices [0-63] of memory object A, and writes into indices [0-63] of memory object C; and so on. Instruction inst12 is an example of an instruction that reads from and write to the same memory object. More specifically, instruction inst12 reads from indices [0-16] of memory object F, and writes into indices [32-47] of memory object F.

In the context of a neural network, a memory object may refer to a tensor or a portion of a tensor, and each index may refer to an element or an individual value (e.g., a feature map value, a weight value, etc.) in the tensor. An instruction may read from and/or write to an individual element of a tensor, a partial or entire row of a tensor, a partial or entire column of a tensor, a section of a tensor spanning multiple partial/ entire rows and columns, or an entire tensor. An instruction can be associated with a load operation, a store operation, a matrix-multiply operation, a pooling operation, or an activation operation, etc.

FIG. 4 illustrates the concept of a memory object in relation to physical memory. FIG. 4 shows a physical memory array 400. Physical memory array 400 can be a buffer memory, system memory, set of registers, or other addressable storage in a computing system. Physical memory array 400 can be organized as rows and columns of storage elements. Physical memory array 400 can be implemented using static random access memory (e.g., to implement a buffer memory), dynamic random access memory (e.g., to implement system memory), or other suitable memory or storage technologies. In some implementations, a row or a group of rows (or a portion thereof) can be considered a partition of physical memory array 400.

During compilation, an allocator may assign physical memory addresses to a memory object Mem 402. As shown in FIG. 4, memory object Mem 402 may occupy a rectangular section of physical memory 400. Hence, the physical memory addresses assigned to a memory object Mem 402 spans a rectangular section of memory in physical memory array 400. The rectangular section may occupy one or more partial rows and one or more partial columns of physical memory 400. In other words, memory object Mem 402 need not span the entire row width or an entire partition of physical memory 400. As such, an allocator may assign a set of address ranges to memory object Mem 402, where each address range represents a portion of a row of physical memory 400.

To avoid spilling conditions, a scheduler can optimize the sequence of instructions being executed such that instructions writing to and reading from memory object Mem 402 are grouped together and executed consecutively. This allows the allocator to minimize the lifetime of memory object Mem 402 such that the physical memory space can be freed up for other instructions. If intervening instructions are scheduled in between instructions that operate on memory object Mem 402, the duration that the physical memory space remains allocated to memory object Mem 402 is extended. If the physical memory 400 does not have sufficient capacity to allocate additional memory to the current instructions being executed, parts of memory object Mem 402 may have to be spilled or copied elsewhere, causing additional latency to transfer the data back and forth.

In the context of executing a neural network in an accelerator, physical memory 400 can be a buffer (e.g., state buffer, result buffer, etc.) in the accelerator, and memory object Mem 402 can represent a two-dimensional tensor or a portion of a tensor that corresponds to a memory region in the buffer memory of the neural network accelerator. Preventing spilling conditions by grouping instructions that operate on the same tensor together can increase throughput by limiting the number of accesses to system memory and eliminating the latencies associated with such accesses.

Although FIG. 4 illustrates a memory object as spanning a rectangular section of the physical memory array, in other implementations, the physical memory addresses can be allocated to a memory object in a different manner. In general, contiguous or discontiguous physical memory address range(s) can be allocated to a memory object in any manner. For example, a contiguous block of physical memory spanning the full width of the physical memory can be allocated to a memory object, different sections of one or more partitions of the physical memory with or without any alignment to each other can be allocated to a memory object, etc. Furthermore, the memory objects can represent other information such as scalars, integers, variables, strings, etc. that instructions can operate on.

FIGS. 5A-G shows a series of diagrams of an example of generating a representation of a memory flow graph (e.g., memory flow graph 500) to facilitate the scheduling of a set of instructions (e.g., set of instructions 300 shown in FIG. 3). In some implementations, memory flow graph 500 can be a directed acyclic graph that shows dependencies of memory objects. The generation of the representation of the memory flow graph 500 and scheduling of the instructions can be performed, for example, by a pre-scheduler such as pre-scheduler 252. The process may begin by receiving a set of instructions that operates on memory objects. Referring back to FIG. 3 as an example, the set of instructions 300 includes sixteen instructions inst1 to inst16 that collectively operates on seven memory objects MemA to MemG. In some implementations, the set of instructions can be instructions for a neural network that operates on tensors represented as memory objects.

The representation of a memory flow graph can be generated by performing, for each of the memory objects: (a) determining a first instruction that performs a first write into the memory object, and a second instruction subsequent to the first instruction in the set of instructions that performs a read from the memory object and writes into a dependent memory object, where the first write and the first read are performed on an overlapping region of the memory object; and (b) generating a flow dependency edge between the memory object and the dependent memory object in the memory flow graph to indicate that the dependent memory object depends on the memory object. When all the memory objects have been processed and the representations of the memory flow graph is complete, the memory objects can be sorted into a sequence of memory objects according to their dependencies in the memory flow graph. The set of instructions can then be scheduled according to the sequence of memory objects, where instructions that writes to an earlier memory object in sequence of memory objects are scheduled to be executed before instructions that writes to a subsequent memory object in sequence of memory objects.

Figure 5A:
FIGS. 5A-G illustrate an example of constructing a representation of a memory flow graph.
Figure 5B:
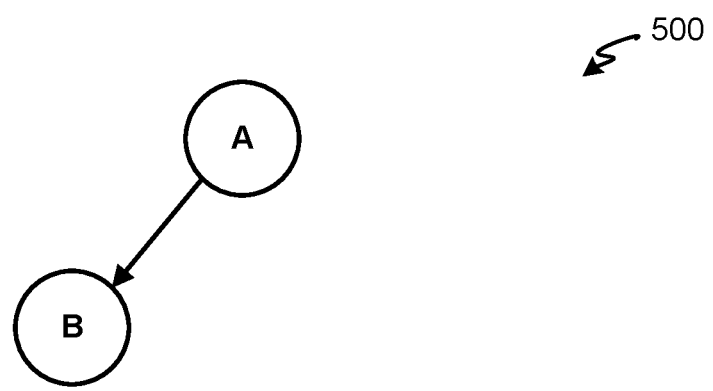

Referring to the set of instructions 300 in FIG. 3 and FIG. 5A, the memory object MemA does not depend on another memory object, and thus memory object MemA can be selected as an initial memory object in memory flow graph 500. Instruction inst2 reads from an overlapping section of memory object MemA written by inst1, and writes into memory object MemB. As such, instruction inst2 depends on instruction inst1, and memory object MemB can be determined as being dependent on memory object MemA. Referring to FIG. 5B, a flow dependency edge can be generated between memory object MemA and memory object MemB in memory flow graph 500 to indicate that memory object MemB depends on memory object MemA.

Figure 5C:
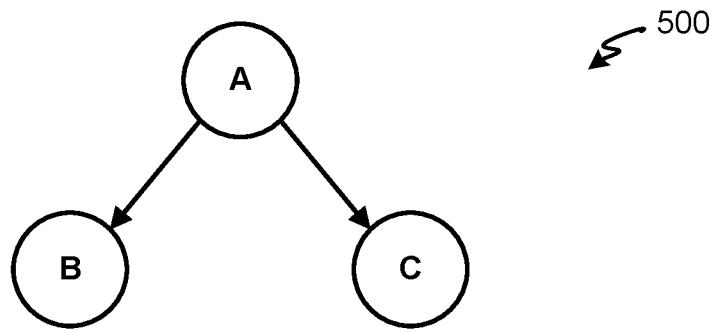

The next memory dependency in the set of instructions 300 is encountered in instruction inst5. Instruction inst5 reads from an overlapping section of memory object MemA written by instructions inst1 and inst3, and writes into memory object MemC. As such, instruction inst5 depends on instructions inst1 and inst3, and memory object MemC can be determined as being dependent on memory object MemA. Referring to FIG. 5C, a flow dependency edge can be generated between memory object MemA and memory object MemC in memory flow graph 500 to indicate that memory object MemC depends on memory object MemA.

Figure 5D:
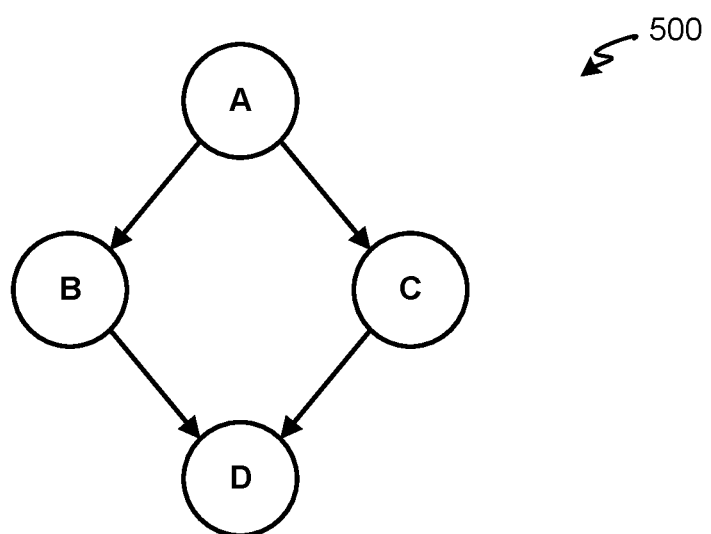

Continuing with the set of instructions 300, the next memory dependency is encountered in instructions inst7 and inst8. Instruction inst7 reads from memory object MemB and writes into memory object MemD, and instruction inst8 reads from memory object MemC and writes into memory object MemD. As such, memory object MemD can be determined as being dependent on memory object MemB and memory object MemC. Referring to FIG. 5D, a first flow dependency edge can be generated between memory object MemB and memory object MemD in memory flow graph 500 to indicate that memory object MemD depends on memory object MemB, and a second flow dependency edge can be generated between memory object MemC and memory object MemD in memory flow graph 500 to indicate that memory object MemD depends on memory object MemC.

Figure 5E:
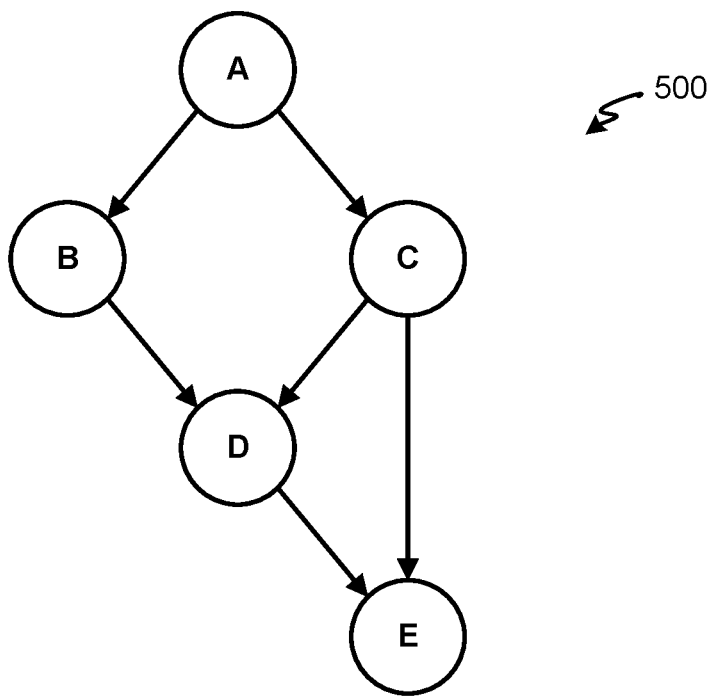

Referring to instructions inst9 and ins11, instruction inst9 reads from memory object MemC and writes into memory object MemE, and instruction inst11 reads from memory object MemD and writes into memory object MemE. As such, memory object MemE can be determined as being dependent on memory object MemC and memory object MemD. Referring to FIG. 5E, a first flow dependency edge can be generated between memory object MemC and memory object MemE in memory flow graph 500 to indicate that memory object MemE depends on memory object MemC, and a second flow dependency edge can be generated between memory object MemD and memory object MemE in memory flow graph 500 to indicate that memory object MemE depends on memory object MemD.

Figure 5F:
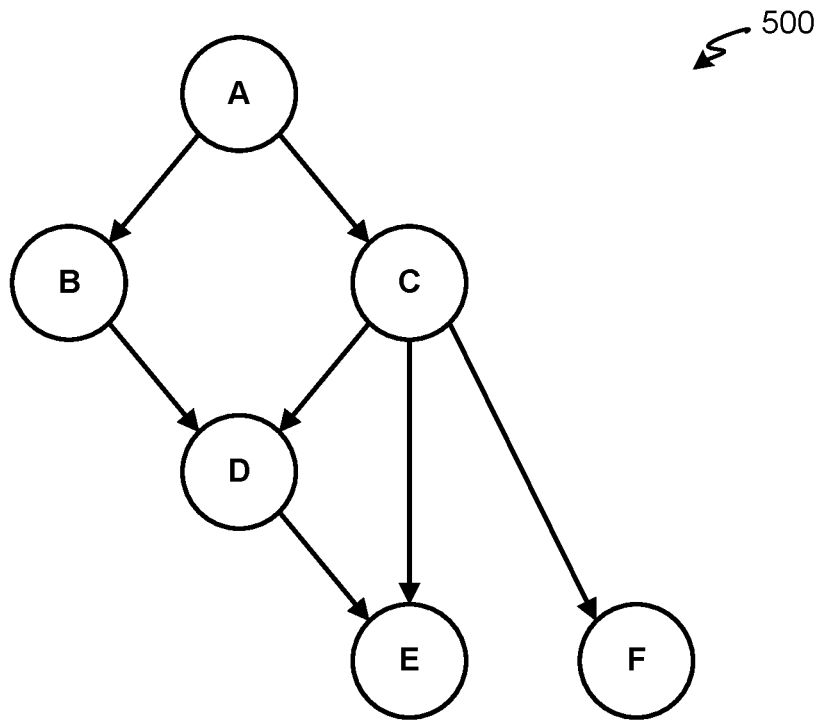

Next, referring to instruction inst13, instruction inst13 reads from memory object MemC and writes into memory object MemF. As such, memory object MemF can be determined as being dependent on memory object MemC. Referring to FIG. 5F, a flow dependency edge can be generated between memory object MemC and memory object MemF in memory flow graph 500 to indicate that memory object MemF depends on memory object MemC.

Figure 5G:
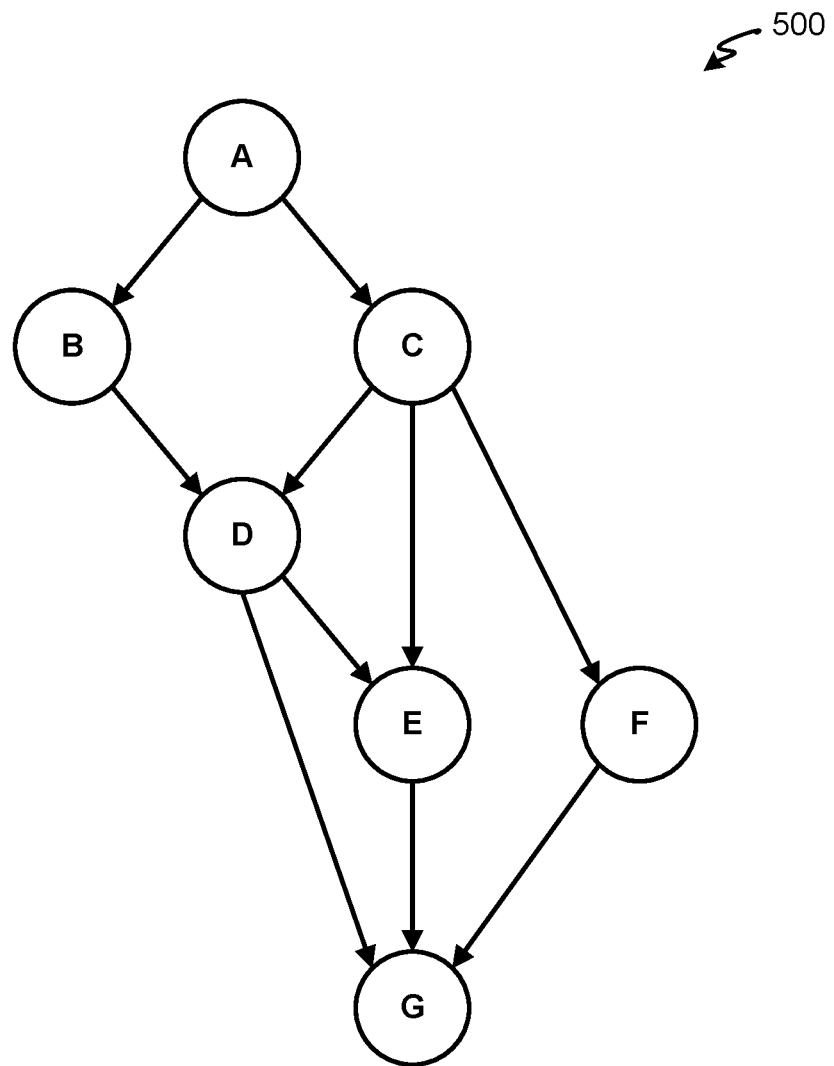

Lastly, referring to instructions inst14, inst15, and inst16, instruction inst14 reads from memory object MemD and writes into memory object MemG, instruction inst15 reads from memory object MemE and writes into memory object MemG, and instruction inst16 reads from memory object MemF and writes into memory object MemG. As such, memory object MemG can be determined as being dependent on memory object MemD, memory object MemE, and memory object MemF. Referring to FIG. 5G, a first flow dependency edge can be generated between memory object MemD and memory object MemG in memory flow graph 500 to indicate that memory object MemG depends on memory object MemD, a second flow dependency edge can be generated between memory object MemE and memory object MemG to indicate that memory object MemG depends on memory object MemE, and a third flow dependency edge can be generated between memory object MemF and memory object MemG to indicate that memory object MemG depends on memory object MemF. Memory flow graph 500 is now complete for the sixteen instructions in the set of instructions 300.

Figure 6:
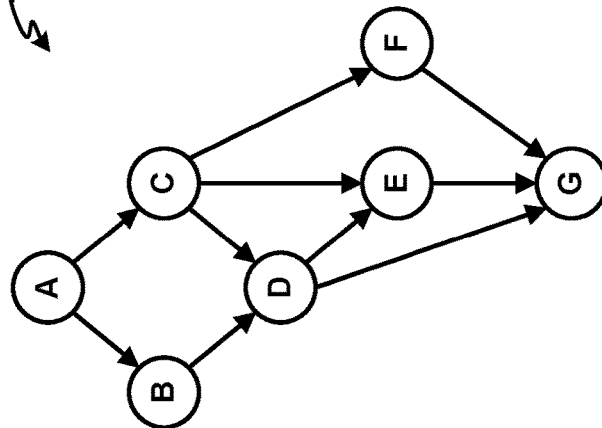
FIG. 6 illustrates a conceptual diagram of scheduling instructions.

FIG. 6 illustrates a conceptual diagram of an example of scheduling instructions based on a memory flow graph such as memory flow graph 500. Memory flow graph 500 is reproduced in FIG. 6. Based on the dependencies as indicated in memory flow graph 602, the memory objects memA to memG can be sorted into an ordered list of memory objects as sequence of memory objects 604. The memory objects can be sorted, for example, by selecting memory object memA which does not depend on another memory object to be an initial memory object of the sequence of memory objects 604, then arranging memory object memB that depends on memory object memA to follow memory object memA in the sequence of memory objects 604. Memory object memC also depends on memory object memA, and thus can be arranged to be after memory object memA in the sequence of memory objects 604. Because memory objects memB and memC both depend on memory object memA without any intervening dependencies, the ordering of memory objects memB and memC can be interchangeable.

Next, memory object memD which depends on memory objects memB and memC is arranged to be after memory objects memB and memC in the sequence of memory objects 604. Memory object memE which depends on memC and memD is arranged to be after memory objects memC and memD in the sequence of memory objects 604. Memory object memF which depends on memory object memC is arranged to be after memory object memC in the sequence of memory objects 604. Finally, memory object memG which depends on memory object memD, memory object meme, and memory object memE is arranged to be after these memory objects in the sequence of memory objects 604. The sequence of memory objects 604 can be provided to an allocator (e.g., allocator 254) to assign physical memory addresses to each memory object.

After properly scheduling the memory objects in an ordered sequence, the instructions associated with the memory objects can be readily scheduled. Referring to FIG. 6, table 606 lists each instruction that writes to a particular memory object. For example, instructions inst1, inst3, inst4, and inst6 each writes to memory object memA; instruction inst2 writes to memory object memB; instruction inst5 writes to memory object memC; instructions inst7 and inst8 each writes to memory object memD; instructions inst9 and inst11 each writes to memory object memE; instructions inst10, inst12, and inst13 each writes to memory object memF; and instructions inst14, inst15, and inst16 each writes to memory object memG.

The instructions can then be scheduled according to the sequence of memory objects 604, in which instructions that writes to an earlier memory object in sequence of memory objects 604 are scheduled to be executed before instructions that writes to a subsequent memory object in sequence of memory objects 604. Scheduling the instructions according to each successive row in table 606 following the order of memory objects, the sequence of instructions 608 representing the scheduled set of instructions in an order list can be generated. As shown in FIG. 6, the sequence of instructions scheduled by the pre-scheduler can be inst1, inst3, inst4, inst6, inst2, inst5, inst7, inst8, inst9, inst11, inst10, inst12, inst13, inst14, inst15, and inst16. This sequence of instructions 608 or scheduled set of instructions can be provided to a post-scheduler to rearrange instructions that write to the same memory object based on load and usage latencies.

As shown in FIG. 6, by sorting memory objects instead of instructions, the number of items that the pre-scheduler operates on can be reduced. More specifically, with respect to the set of instructions 300, instead of having to directly schedule and sort sixteen instructions, the technique described herein only requires sorting of seven memory objects. When scaling this to millions of instructions and thousands of memory objects, the scheduling process can be performed much faster to reduce compilation time because the number of items being operated on and sorted is dramatically reduced. Furthermore, by sorting memory objects, the sequence of memory objects can readily be provided to an allocator for physical memory assignment. This reduces the complexity of the allocator and eliminates the need to translate between instructions and memory objects that the allocator operates on. Furthermore. In the context of neural network accelerators, the scheduling technique described herein automatically satisfies constraints that instructions in the same accumulation group of matrix multiplication operates are kept together, because instructions that are in same accumulation group operate on the same memory object.

Figure 7:
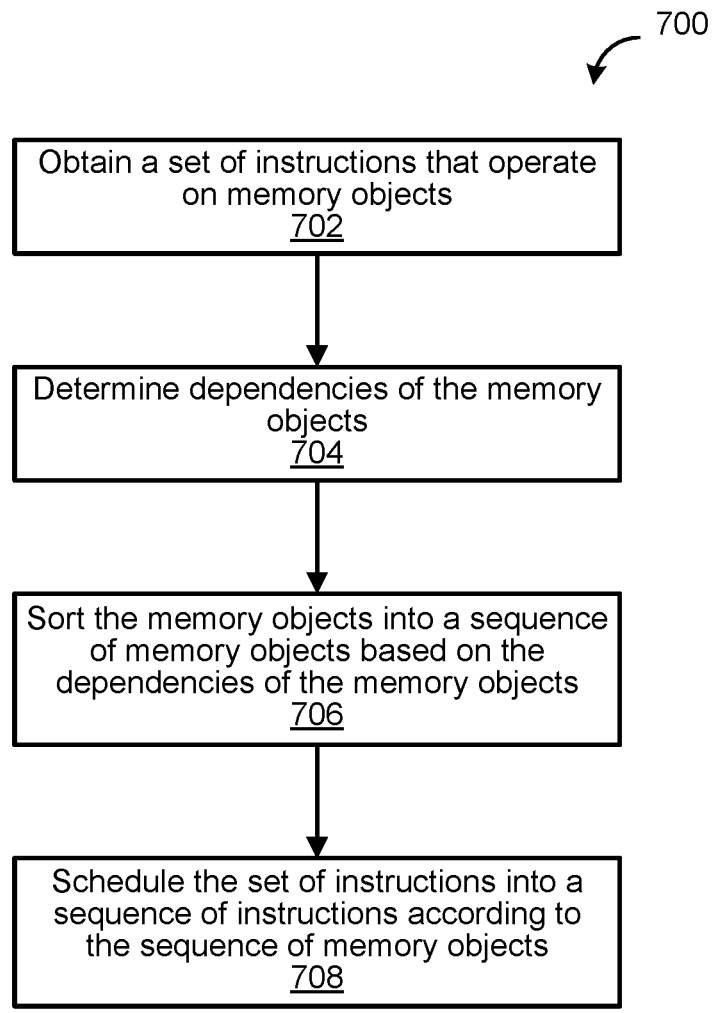
FIG. 7 illustrates a flow diagram of an example of a process for scheduling instructions.

FIG. 7 illustrates a flow diagram of an example of a process 700 for scheduling instructions. Process 700 can be performed, for example, by a pre-scheduler of a compiler, and can implemented as code stored in a computer-readable medium that can be executed by one or more processors.

Process 700 may begin at block 702 by obtaining a set of instructions that operate on memory objects. The set of instructions can be machine instructions that the compiler has derived from a program written in a programming language. For instance, the set of instructions can be machine instructions for execution on a neural network accelerator that were derived from a description of a neural network written in C++, Python, JavaScript, or other suitable programming language. Examples of such instructions for a neural network may include a load operation, a store operation, a matrix-multiply operation, a pooling operation, or an activation operation, etc. Each instruction can be represented in terms of a memory object that the instruction writes to. Some instructions may read from one memory object, and write to the same or different memory object. Each memory object can be written or read by one or more instructions, and different instructions can operate on the same or different portions of a memory object. In the context of neural networks, a memory object may correspond to a tensor or a portion of a tensor, and the memory objects associated with a set of instructions may correspond to one or more tensors of the neural network.

At block 704, the dependencies of the memory objects are determined. The memory object dependencies can be determined, for example, by determining a first instruction that performs a first write operation into a first memory object, and a second instruction subsequent to the first instruction in the set of instructions that performs a read operation from the first memory object and performs a second write operation into a second memory object. For such a pair of instructions, the second memory object can be determined as depending on the first memory object. The first write operation may write into a first portion of the first memory object, and the read operation may read from a second potion of the first memory object that is different than the first portion. So long as the first portion and the second portion overlap with each other in a section of the first memory object, the second memory object is considered to be dependent on the first memory object. If no overlap exists between the first write operation and the read operation, then the second memory object may not be considered as being dependent on the first memory object based on this pair of instructions. This memory dependency process can be repeated for every pair of instructions in which the first instruction writes to and the second instruction reads from the same memory object with some overlap. In some implementations, a representation of a memory flow graph or a directed acyclic graph such as the one shown in FIG. 5 can be generated to keep track of the memory object dependencies.

At block 706, the memory objects can be sorted into a sequence of memory objects based on the dependencies of the memory objects. The memory objects can be sorted, for example, by selecting a first memory object that does not depend on another memory object to be the initial memory object of the sequence of memory objects, arranging a second memory object that depends on the first memory object to follow the initial memory object in the sequence of memory objects, and arranging a third memory object that depends on the second memory object to follow the second memory object in the sequence of memory objects. This process can be repeated for each memory object, for example, by traversing the memory flow graph.

As mentioned above, the sequence of memory objects generated at block 706 can be readily provided to an allocator to assign memory addresses (e.g., physical memory addresses) to each memory object. In some implementations, the memory addresses assigned to a memory object by the allocator may span a rectangular section of memory in a memory array. As such, the memory addresses assigned to a memory object may include ranges of memory addresses that are non-contiguous. In the context of a neural network accelerator, the memory addresses assigned to a memory object may correspond to a state buffer that stores inputs to a systolic array or a result buffer that stores outputs from a systolic array.

At block 708, the set of instructions can be scheduled into a sequence of instructions according to the sequence of memory objects. For example, given an ordered sequence of memory objects, instructions that write to the initial memory object can be scheduled before instructions that write to the second memory object, instructions that write to the second memory object can be scheduled before instructions that write to the third memory object, and so on. In this manner, instructions that write to the same memory object can be kept together. The ordered sequence of instructions can subsequently be provided to a post-scheduler to optimize the order of instructions within each set of instructions writing to the same memory object.

Figure 8:
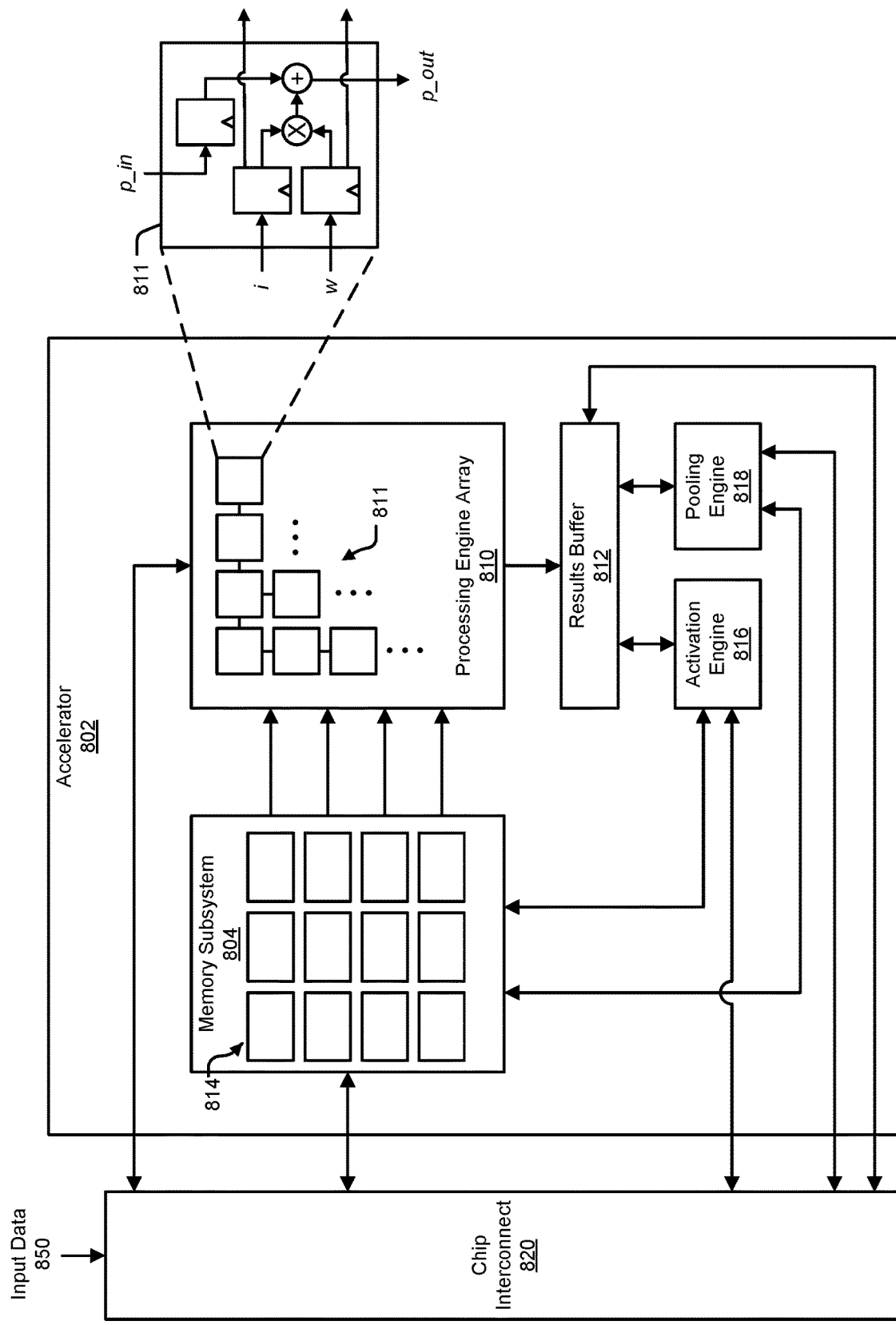
FIG. 8 is a block diagram illustrating an example of an integrated circuit device.

FIG. 8 is a block diagram illustrating an example of an integrated circuit device that can include an accelerator 802. In various examples, the accelerator 802, for a set of input data (e.g., input data 850), can execute computations using a processing engine array 810, an activation engine 816, and/or a pooling engine 818. In some examples, the example accelerator 802 may be an integrated circuit component of a processor, such as a neural network processor. The processor may have other integrated circuit components, including additional accelerator engines.

In various implementations, the memory subsystem 804 can include multiple memory banks 814. In these implementations, each memory bank 814 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 814. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 804 can permit simultaneous access to the read or write channels of multiple memory banks. As another example, the memory subsystem 804 can include arbitration logic such that arbitration between, for example, the outputs of multiple memory banks 814 can result in more than one memory bank's output being used. In these and other examples, though globally managed by the memory subsystem 804, each memory bank can be operated independently of any other.

Having the memory banks 814 be independently accessible can increase the efficiency of the accelerator 802. For example, values can be simultaneously read and provided to each row of the processing engine array 810, so that the entire processing engine array 810 can be in use in one clock cycle. As another example, the memory banks 814 can be read at the same time that results computed by the processing engine array 810 are written to the memory subsystem 804. In contrast, a single memory may be able to service only one read or write at a time. With a single memory, multiple clock cycles can be required, for example, to read input data for each row of the processing engine array 810 before the processing engine array 810 can be started.

In various implementations, the memory subsystem 804 can be configured to simultaneously service multiple clients, including the processing engine array 810, the activation engine 816, the pooling engine 818, and any external clients that access the memory subsystem 804 over a communication fabric 820. In some implementations, being able to service multiple clients can mean that the memory subsystem 804 has at least as many memory banks as there are clients. In some cases, each row of the processing engine array 810 can count as a separate client. In some cases, each column of the processing engine array 810 can output a result, such that each column can count as a separate write client. In some cases, output from the processing engine array 810 can be written into the memory banks 814 that can then subsequently provide input data for the processing engine array 810. As another example, the activation engine 816 and the pooling engine 818 can include multiple execution channels, each of which can be separate memory clients. The memory banks 814 can be implemented, for example, using static random access memory (SRAM).

In various implementations, the memory subsystem 804 can include control logic. The control logic can, for example, keep track of the address spaces of each of the memory banks 814, identify memory banks 814 to read from or write to, and/or move data between the memory banks 814. In some implementations, memory banks 814 can be hardwired to particular clients. For example, a set of memory banks 814 can be hardwired to provide values to the rows of the processing engine array 810, with one memory bank servicing each row. As another example, a set of memory banks can be hard wired to receive values from columns of the processing engine array 810, with one memory bank receiving data for each column.

The processing engine array 810 is the computation matrix of the example accelerator 802. The processing engine array 810 can, for example, execute parallel integration, convolution, correlation, and/or matrix multiplication, among other things. The processing engine array 810 includes multiple processing engines 811, arranged in rows and columns, such that results output by one processing engine 811 can be input directly into another processing engine 811. Processing engines 811 that are not on the outside edges of the processing engine array 810 thus can receive data to operate on from other processing engines 811, rather than from the memory subsystem 804.

In various examples, the processing engine array 810 uses systolic execution, in which data arrives at each processing engine 811 from different directions at regular intervals. In some examples, input data can flow into the processing engine array 810 from the left and weight values can be loaded at the top. In some examples weights and input data can flow from the left and partial sums can flow from top to bottom. In these and other examples, a multiply-and-accumulate operation moves through the processing engine array 810 as a diagonal wave front, with data moving to the right and down across the array. Control signals can be input at the left at the same time as weights, and can flow across and down along with the computation.

In various implementations, the number of columns in the processing engine array 810 determines the computational capacity of the processing engine array 810, and the number of rows determines the required memory bandwidth for achieving maximum utilization of the processing engine array 810. The processing engine array 810 can have, for example, 64 columns and 428 rows, or some other number of columns and rows.

An example of a processing engine 811 is illustrated in FIG. 8 in an inset diagram. As illustrated by this example, a processing engine 811 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 811.

In the illustrated example, an input from above can include a partial sum, p_in, provided either from another processing engine 811 or from a previous round of computation by the processing engine array 810. When starting a computation for a new set of input data, the top row of the processing engine array 810 can receive a fixed value for p_in, such as zero. As illustrated by this example, i and w are multiplied together and the result is summed with p_in to produce a new partial sum, p_out, which can be input into another processing engine 811. Various other implementations of the processing engine 811 are possible.

Outputs from the last row in the processing engine array 810 can be temporarily stored in the results buffer 812. The results can be intermediate results, which can be written to the memory banks 814 to be provided to the processing engine array 810 for additional computation. Alternatively, the results can be final results, which, once written to the memory banks 814 can be read from the memory subsystem 804 over the communication fabric 820, to be output by the system.

In some implementations, the accelerator 802 includes an activation engine 816. In these implementations, the activation engine 816 can combine the results from the processing engine array 810 into one or more output activations. For example, for a convolutional neural network, convolutions from multiple channels can be summed to produce an output activation for a single channel. In other examples, accumulating results from one or more columns in the processing engine array 810 may be needed to produce an output activation for a single node in the neural network. In some examples, activation engine 816 can be bypassed.

In various examples, the activation engine 816 can include multiple separate execution channels. In these examples, the execution channels can correspond to the columns of the processing engine array 810, and can perform an operation on the outputs of a column, the result of which can be stored in the memory subsystem 804. In these examples, the activation engine 816 may be able to perform between 1 and n parallel computations, where n is equal to the number of columns in the processing engine array 810. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 802 can include a pooling engine 818. Pooling is the combining of outputs of the columns of the processing engine array 810. Combining can include for example, computing a maximum value, a minimum value, an average value, a median value, a summation, a multiplication, or another logical or mathematical combination. In various examples, the pooling engine 818 can include multiple execution channels that can operating on values from corresponding columns of the processing engine array 810. In these examples, the pooling engine 818 may be able to perform between 1 and n parallel computations, where n is equal to the number of columns in the processing engine array 810. In various examples, execution channels of the pooling engine 818 can operate in parallel and/or simultaneously. In some examples, the pooling engine 818 can be bypassed.

Herein, the activation engine 816 and the pooling engine 818 may be referred to collectively as execution engines. The processing engine array 810 is another example of an execution engine. Another example of an execution engine is a Direct Memory Access (DMA) engine, which may be located outside the accelerator 802.

Input data 850 can arrive over the communication fabric 820. The communication fabric 820 can connect the accelerator 802 to other components of a processor, such as a DMA engine that can obtain input data 850 from an Input/Output (I/O) device, a storage drive, or a network interface. The input data 850 can be, for example one-dimensional data, such as a character string or numerical sequence, or two-dimensional data, such as an array of pixel values for an image or frequency and amplitude values over time for an audio signal. In some examples, the input data 850 can be three-dimensional, as may be the case with, for example, the situational information used by a self-driving car or virtual reality data. In some implementations, the memory subsystem 804 can include a separate buffer for the input data 850. In some implementations, the input data 850 can be stored in the memory banks 814 when the accelerator 802 receives the input data 850.

In some examples, the accelerator 802 can implement a neural network processing engine. In these examples, the accelerator 802, for a set of input data 850, can execute a neural network to perform a task for which the neural network was trained. Executing a neural network on a set of input data can be referred to as inference or performing inference.

The weights for the neural network can be stored in the memory subsystem 804, along with input data 850 on which the neural network will operate. The neural network can also include instructions, which can program the processing engine array 810 to perform various computations on the weights and the input data. The instructions can also be stored in the memory subsystem 804, in the memory banks 814 or in a separate instruction buffer. The processing engine array 810 can output intermediate results, which represent the outputs of individual layers of the neural network. In some cases, the activation engine 816 and/or pooling engine 818 may be enabled for computations called for by certain layers of the neural network. The accelerator 802 can store the intermediate results in the memory subsystem 804 for inputting into the processing engine array 810 to compute results for the next layer of the neural network. The processing engine array 810 can further output final results from a last layer of the neural network. The final results can be stored in the memory subsystem 804 and then be copied out to host processor memory or to another location.

Figure 9:
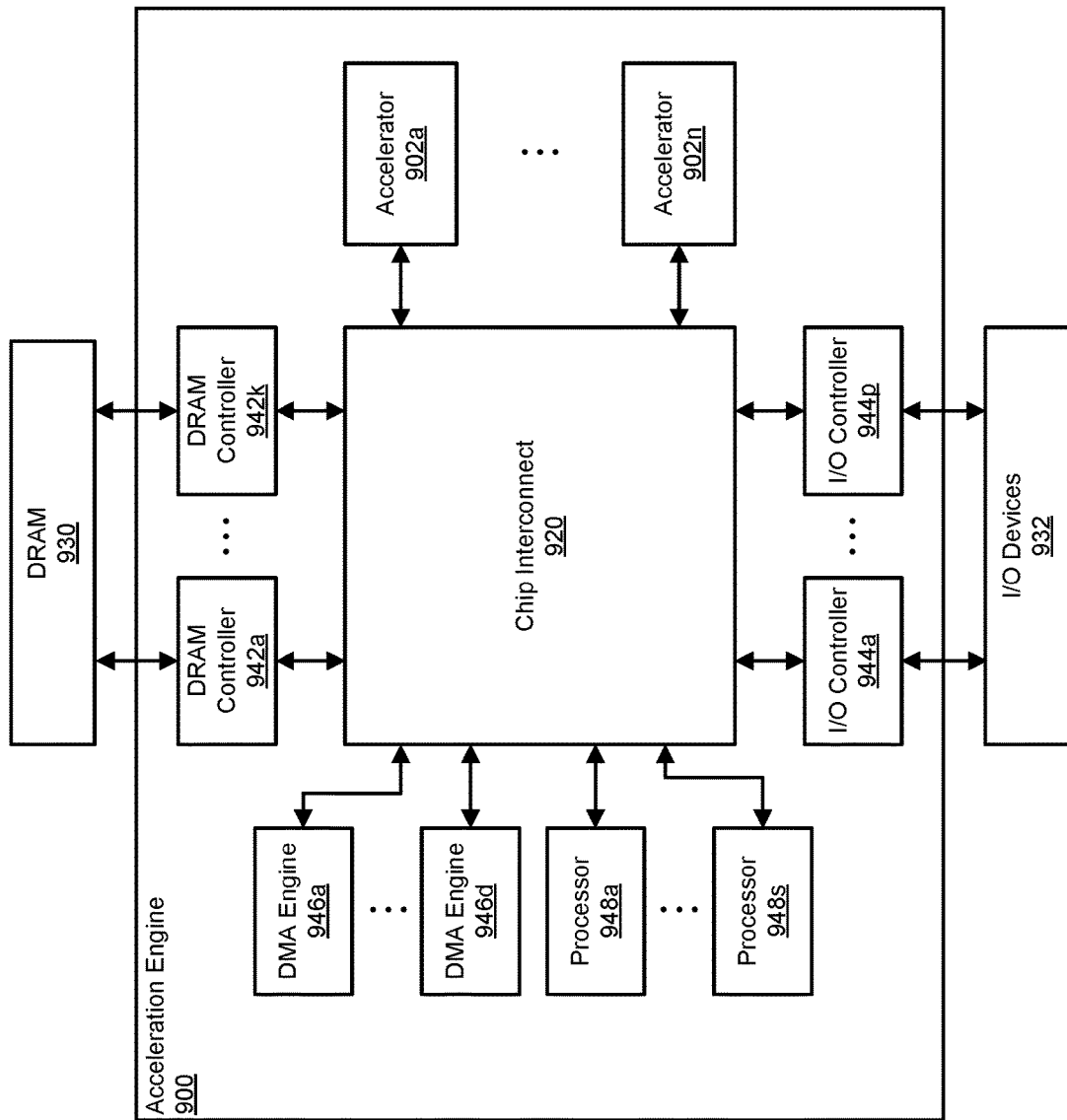
FIG. 9 includes a block diagram that illustrates an example of an acceleration engine.

FIG. 9 includes a block diagram that illustrates an example of an acceleration engine 900. The acceleration engine 900 is an example of an integrated circuit that can include one or more accelerators 902*a*-902*n* that may be similar to the accelerator illustrated in FIG. 8.

In the example of FIG. 9, the acceleration engine 900 includes multiple accelerators 902*a*-902*n*, each of which can perform a set of operations. In various examples, the accelerators 902*a*-902*n* are for particular types of operations, so that the accelerators 902*a*-902*n* can perform the operations much faster than when similar operations are performed by a general purpose processor. In various examples, to perform a set of operations, input data on which the operations are to be performed must first be moved into the accelerators 902a-902n. Additionally, in some cases, program code is also moved into the accelerators 902a-902n, which programs the operations that the accelerators 902a-902n will perform on the data. In the illustrated example, the acceleration engine 900 includes n accelerators 902a-902n. Examples of accelerators that can be included in the acceleration engine 900 include graphics accelerators, floating point accelerators, neural network accelerators, and others. In various examples, the accelerators 902a-902n can each be the same (e.g., each of the is a graphics accelerator) or can be different (e.g., the accelerators 902a-902n include a graphics accelerator, a floating point accelerator, and neural network accelerator).

The example acceleration engine 900 further includes DRAM controllers 942a-942k for communicating with an external memory. The external memory is implemented, in this example, using DRAM 930. In the illustrated example, the acceleration engine 900 includes k DRAM controllers 942a-942k, each of which may be able to communicate with an independent set of banks of DRAM. In other examples, other types of RAM technology can be used for the external memory. The DRAM controllers 942a-942k can also be referred to as memory controllers.

In various examples, input data and/or program code for the accelerators 902a-902n can be stored in the DRAM 930. Different programs can cause the accelerators 902a-902n to perform different operations. For example, when one of the accelerators is a neural network accelerator, one program can configure the neural network accelerator to perform speech recognition while another program can configure the neural network accelerator to perform image recognition. In various examples, different accelerators 902a-902n can be programmed with different programs, so that each performs a different set of operations. In various examples, the processors 948a-948s can manage moving of program code from the DRAM 930 to the accelerators 902a-902n.

The example acceleration engine 900 further includes I/O controllers 944a-944p for communicating with I/O devices 932 in the system. The acceleration engine 900 can communicate with I/O devices over, for example, a processor bus. In some examples, the processor bus can be implemented using Peripheral Component Interconnect (PCI) and/or a variation of the PCI bus protocol. The processor bus can connect the acceleration engine 900 to I/O devices such as, for example, input and output devices, memory controllers, storage devices, and/or network interface cards, among other things. In some examples, the I/O controllers 944-944p can enable the acceleration engine 900 to act as an I/O device for a host processor. For example, the acceleration engine 900 can be the recipient of input data from the host processor, and a command indicating an operation to be performed on the input data (e.g., a particular computation or analysis). In the illustrated example, the acceleration engine 900 includes p I/O controllers 944a-944p, each of which may include a separate root complex and may communicate with a separate set of I/O devices 932. In other examples, other standardized bus protocols, such as Ultra Path Interconnect (UPI) can be used for the host bus. In other examples, a proprietary bus protocol can be used.

Movement of data in the acceleration engine 900 can be managed by one or more processors 948a-948s, which can also be referred to as data management processors. In the example of FIG. 9, the acceleration engine 900 includes s processors 948a-948s incorporated into the device (e.g., on the same silicon die). In other examples, the processors 948a-948s can be external to the acceleration engine 900 (e.g., on a different die and/or in a different package). In some examples, the processors 948a-948s can manage the movement of data from I/O devices 932 to the accelerators 902a-902n or the DRAM 930. For example, input data may be located at an I/O device 932 or in processor memory, and the processors 948a-948s can move the input from the I/O device 932 or processor memory into an accelerator or into DRAM 930. As another example, program code for the accelerators 902a-902n may be located on an I/O device 932 or in processor memory.

The example acceleration engine 900 further includes DMA engines 946a-946d that can move data between the accelerators 902a-902n, DRAM controllers 942a-942k, and I/O controllers 944a-944p. In the illustrated example, the acceleration engine 900 includes d DMA engines 946a-946d. In some implementations, the DMA engines 946a-946d can be assigned to specific tasks, such as moving data from the DRAM controllers 942a-942d to the accelerators 902a-902n, or moving data between the I/O controllers 944a-944p and the accelerators 902a-902n. These tasks can be assigned, for example, by enqueueing descriptors with the DMA engines 946a-946d, where a descriptor identifies an address for a block of data and an operation (e.g., a read or a write) to perform. A descriptor, for example, can direct a DMA engine to instruct a DMA controller to read a block of data from DRAM 930. A descriptor can, as a further example, instruct the DMA engine to write data, read by the DMA controller, to an accelerator. Further descriptors can be used to move data from an accelerator to DRAM 930.

In various examples, each of the processors 948a-948s can be responsible for managing the data movement for a different accelerator. In some examples, a processor may manage the data movement for more than one accelerator. Similarly, in various examples, each of the processors 948a-948s can be assigned to one or more DMA engines 946a-946d. In these and other examples, associations between processors 948a-948s, accelerators 902a-902n, and DMA engines 946a-946d are determined by program code being executed by each respective processor.

In the example acceleration engine 900, the various components can communicate over a chip interconnect 920. The chip interconnect 920 primarily includes wiring for routing data between the components of the acceleration engine 900. In some cases, the chip interconnect 920 can include a minimal amount of logic, such as multiplexors to control the direction of data, flip-flops for handling clock domain crossings, and timing logic.

Figure 10:
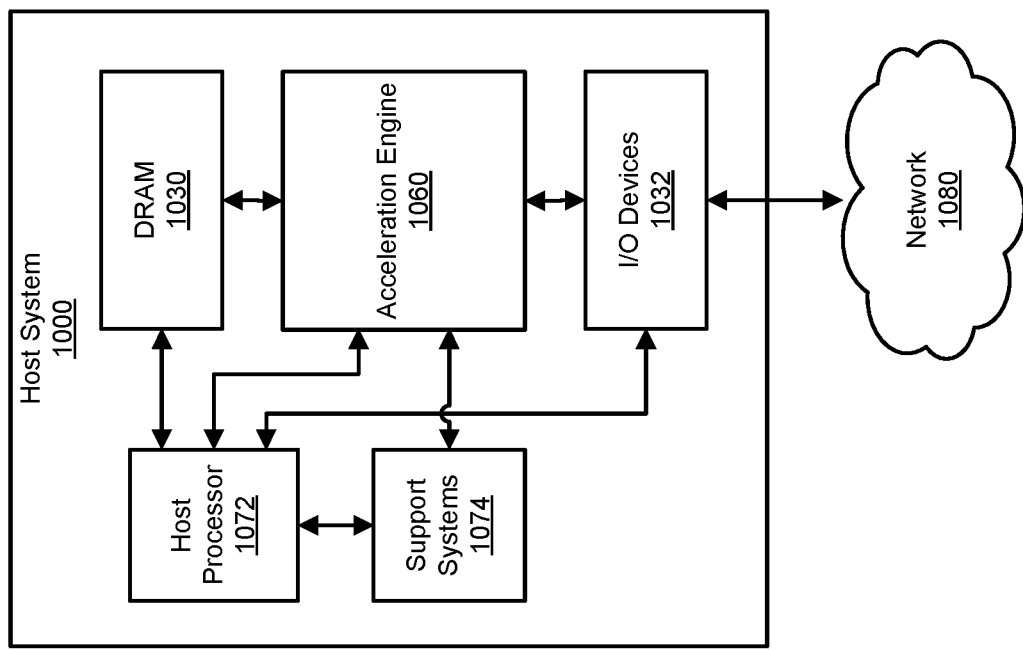
FIG. 10 includes a block diagram that illustrates an example of a host system.

FIG. 10 includes a block diagram that illustrates an example of a host system 1000 in which an acceleration engine 1060 can be used. The acceleration engine 1060 of FIG. 10 is an example of a device that can include one or more accelerators such as is illustrated in FIG. 9. The example host system 1000 of FIG. 10 includes the acceleration engine 1060, a host processor 1072, DRAM 1030 or processor memory, I/O devices 1032, and support systems 1074. In various implementations, the host system 1000 can include other hardware that is not illustrated here.

The host processor 1072 is a general purpose integrated circuit that is capable of executing program instructions. In some examples, the host processor 1072 can include multiple processing cores. A multi-core processor may include multiple processing units within the same processor. In some examples, the host system 1000 can include more than one host processor 1072. In some examples, the host processor 1072 and the acceleration engine 1060 can be one chip, such as, one or more integrated circuits within the same package.

In various examples, the host processor 1072 can communicate with other components in the host system 1000 over one or more communication channels. For example, the host system 1000 can include a host processor bus, which the host processor 1072 can use to communicate with the DRAM 1030, for example. As another example, the host system 1000 can include an I/O bus, such as a PCI-based bus, over which the host processor 1072 can communicate with the acceleration engine 1060 and/or the I/O devices 1032, for example. In various examples, the host system 1000 can, alternatively or additionally, include other communication channels or busses, such as serial busses, power management busses, storage device busses, and so on.

In some examples, software programs executing on the host processor 1072 can receive or generate input for processing by the acceleration engine 1060. In some examples, the programs can select an appropriate neural network to execute for a given input. For example, a program may be for language translation, and can select one or more neural networks capable of speech recognition and/or machine translation. In these and other examples, the programs can configure the acceleration engine 1060 with the neural network to execute, and/or can select a neural network processing engine on the acceleration engine 1060 that has previously been configured to execute the desired neural network. In some examples, once the acceleration engine 1060 has started an inference on input data, the host processor 1072 can manage the movement of data (such as weights, instructions, intermediate results, results of conditional layers, and/or final results) into or out of the acceleration engine 1060.

In some examples, a software program that is using the acceleration engine 1060 to conduct an inference can read the result from a conditional layer from the acceleration engine 1060 and/or from a storage location, such as in DRAM 1030. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinated by software.

The DRAM 1030 is memory that is used by the host processor 1072 for storage of program code that the host processor 1072 is in the process of executing, as well as values that are being operated on. In some examples, the data for a neural network (e.g., weight values, instructions, and other data) can be all or partially stored in the DRAM 1030. DRAM is a common term for processor memory, and though DRAM is volatile memory, processor memory can be volatile and/or non-volatile. Though not illustrated here, the host system 1000 can include other volatile and non-volatile memories for other purposes. For example, the host system 1000 can include a Read-Only Memory (ROM) that stores boot code for booting the host system 1000 at power on, and/or Basic Input/Output System (BIOS) code.

Though not illustrated here, the DRAM 1030 can store instructions for various programs, which can be loaded into and be executed by the host processor 1072. For example, the DRAM 1030 can be storing instructions for an operating system, one or more data stores, one or more application programs, one or more drivers, and/or services for implementing the features disclosed herein.

The operating system can manage and orchestrate the overall operation of the host system 1000, such as scheduling tasks, executing applications, and/or controller peripheral devices, among other operations. In some examples, a host system 1000 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers. Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 1000. For example, some drivers can provide communication between the operating system and peripheral devices or I/O devices 1032. Alternatively or additionally, some drivers may provide communication between application programs and the operating system, and/or application programs and peripheral devices accessible to the host system 1000. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 1032 can include hardware for connecting to user input and output devices, such as keyboards, mice, pens, tablets, voice input devices, touch input devices, displays or monitors, speakers, and printers, among other devices. The I/O devices 1032 can also include storage drives and/or network interfaces for connecting to a network 1080. For example, the host system 1000 can use a network interface to communicate with storage devices, user terminals, other computing devices or servers, and/or other networks, among various examples.

In various examples, one or more of the I/O devices 1032 can be storage devices. In these examples, the storage devices include non-volatile memory and can store program instructions and/or data. Examples of storage devices include magnetic storage, optical disks, solid state disks, flash memory, and/or tape storage, among others. The storage device can be housed in the same chassis as the host system 1000 or may be in an external enclosure. A storage device can be fixed (e.g., attached by screws) or removable (e.g., having a physical release mechanism and possibly a hot-plug mechanism).

Storage devices, the DRAM 1030, and any other memory component in the host system 1000 are examples of computer-readable storage media. Computer-readable storage media are physical mediums that are capable of storing data in a format that can be read by a device such as the host processor 1072. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. As used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various examples, one or more of the I/O devices 1032 can be PCI-based devices. In these examples, a PCI-based I/O device includes a PCI interface for communicating with the host system 1000. The term "PCI" or "PCI-based" may be used to describe any protocol in the PCI family of bus protocols, including the original PCI standard, PCI-X, Accelerated Graphics Port (AGP), and PCI-Express(PCIe) or any other improvement or derived protocols that are based on the PCI protocols discussed herein. The PCI-based protocols are standard bus protocols for connecting devices, such as a local peripheral device, to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

A PCI-based device can include one or more functions. A "function" describes the hardware and/or software of an operation that may be provided by the PCI-based device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some examples, the PCI-based device can include single-root I/O virtualization (SR-IOV). SR-IOV is an extended capability that may be included in a PCI-based device. SR-IOV allows a physical resource (e.g., a single network interface controller) to appear as multiple virtual resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

In various implementations, the support systems 1074 can include hardware for coordinating the operations of the acceleration engine 1060. For example, the support systems 1074 can include a microprocessor that coordinates the activities of the acceleration engine 1060, including moving data around on the acceleration engine 1060. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have more limited capability than the host processor 1072. In some examples, the program executed by the microprocessor is stored on the hardware of microprocessor, or on a non-volatile memory chip in the host system 1000. In some examples, the microprocessor and the acceleration engine 1060 can be on chip, such as one integrated circuit on the same die and in the same package.

In some examples, the support systems 1074 can be responsible for taking instructions from the host processor 1072 when programs executing on the host processor 1072 request the execution of a neural network. For example, the host processor 1072 can provide the support systems 1074 with a set of input data and a task that is to be performed on the set of input data. In this example, the support systems 1074 can identify a neural network that can perform the task, and can program the acceleration engine 1060 to execute the neural network on the set of input data. In some examples, the support systems 1074 only needs to select an appropriate neural network processing engine of the neural network processor. In some examples, the support systems 1074 may need to load the data for the neural network onto the acceleration engine 1060 before the acceleration engine 1060 can start executing the neural network. In these and other examples, the support systems 1074 can further receive the output of executing the neural network, and provide the output back to the host processor 1072.

In some examples, the operations of the support systems 1074 can be handled by the host processor 1072. In these examples, the support systems 1074 may not be needed and can be omitted from the host system 1000.

In various examples, the host system 1000 can include a combination of host systems, processor nodes, storage subsystems, and I/O chassis that represent user devices, service provider computers or third party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video, etc.). The user device may be a computing device such as, for example, a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device may be in communication with the service provider computer over one or more networks. Additionally, the user device may be part of the distributed system managed by, controlled by, or otherwise part of the service provider computer (e.g., a console device integrated with the service provider computers).

The host system 1000 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

The modules described herein may be software modules, hardware modules or a suitable combination thereof If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computing system comprising:
   one or more processors; and
   a memory coupled to the one or more processors and storing computer readable code, which when executed by the one or more processors, cause the computing system to perform operations including:
   obtaining a set of instructions for a neural network that operates on tensors represented as memory objects;
   generating a representation of a memory flow graph by:
   for each of the memory objects:
   determining a first instruction that performs a first write operation into the memory object, and a second instruction subsequent to the first instruction in the set of instructions that performs a read operation from the memory object and a second write operation into a dependent memory object, wherein the first write operation and the read operation are performed on an overlapping region of the memory object; and generating a flow dependency edge between the memory object and the dependent memory object in the memory flow graph to indicate that the dependent memory object depends on the memory object;

sorting the memory objects into a sequence of memory objects based on the dependencies of the memory objects; and scheduling the set of instructions according to the sequence of memory objects, wherein instructions that write to an earlier memory object in the sequence of memory objects are scheduled to be executed before instructions that write to a subsequent memory object in the sequence of memory objects.

2. The computing system computer-implemented method of claim 1, wherein the first write operation writes into a first portion of the first memory object, and the read operation reads from a second potion of the first memory object that is different than the first portion, wherein the first portion and the second portion overlap with each other in a section of the first memory object.

3. The computing system of claim 1, wherein sorting the memory objects includes:

selecting a first memory object that does not depend on another memory object to be an initial memory object of the sequence of memory objects;

arranging a second memory object that depends on the first memory object to follow the initial memory object in the sequence of memory objects; and arranging a third memory object that depends on the second memory object to follow the second memory object in the sequence of memory objects.

4. The computing system of claim 3, wherein scheduling the set of instructions includes arranging instructions that write to the second memory object to be before instructions that write to the third memory object in the sequence of instructions.

5. The computing system of claim 1, wherein the sequence of memory objects is provided to an allocator to assign memory addresses to each memory object.

6. The computing system of claim 5, wherein the memory addresses assigned to a memory object span a rectangular section of memory in a memory array.

7. The computing system of claim 5, wherein the memory addresses assigned to a memory object include ranges of memory addresses that are non-contiguous.

8. The computing system of claim 5, wherein the memory addresses assigned to a memory object correspond to a section of a state buffer that stores inputs to a systolic array.

9. The computing system of claim 5, wherein the memory addresses assigned to a memory object correspond to a section of a result buffer that stores outputs of a systolic array.

10. A non-transitory computer readable medium having stored therein instructions that, when executed by one or more processors, cause the one or more processors to execute a compiler, the compiler configured to perform operations including:

receiving a set of instructions for a neural network that operates on tensors represented as memory objects;

generating a representation of a memory flow graph by:
for each of the memory objects:
determining a first instruction that performs a first write operation into the memory object, and a second instruction subsequent to the first instruction in the set of instructions that performs a read operation from the memory object and a second write operation into a dependent memory object, wherein the first write operation and the read operation are performed on an overlapping region of the memory object; and generating a flow dependency edge between the memory object and the dependent memory object in the memory flow graph to indicate that the dependent memory object depends on the memory object;

sorting the memory objects into a sequence of memory objects based on the dependencies of the memory objects; and scheduling the set of instructions according to the sequence of memory objects, wherein instructions that write to an earlier memory object in the sequence of memory objects are scheduled to be executed before instructions that write to a subsequent memory object in the sequence of memory objects.

11. The non-transitory computer readable medium of claim 10, wherein the operations include:

selecting a first memory object that does not depend on another memory object to be an initial memory object of the sequence of memory objects;

arranging a second memory object that depends on the first memory object to follow the initial memory object in the sequence of memory objects; and arranging a third memory object that depends on the second memory object to follow the second memory object in the sequence of memory objects.

12. The non-transitory computer readable medium of claim 11, wherein scheduling the set of instructions includes arranging instructions that write to the second memory object to be before instructions that write to the third memory object in the sequence of instructions.

13. The non-transitory computer readable medium of claim 10, wherein the memory objects correspond to memory regions in a neural network accelerator.

14. A computer-implemented method for scheduling a set of instructions, the computer-implemented method comprising:

receiving the set of instructions for a neural network that operates on tensors represented as memory objects;

generating a representation of a memory flow graph by:
for each of the memory objects:
determining a first instruction that performs a first write into the memory object, and a second instruction subsequent to the first instruction in the set of instructions that performs a read from the memory object and a second write into a dependent memory object, wherein the first write and the read are performed on an overlapping region of the memory object; and generating a flow dependency edge between the memory object and the dependent memory object in the memory flow graph to indicate that the dependent memory object depends on the memory object;

sorting the memory objects into a sequence of memory objects according to their dependencies in the memory flow graph; and scheduling the set of instructions according to the sequence of memory objects, wherein instructions that write to an earlier memory object in the sequence of memory objects are scheduled to be executed before instructions that write to a subsequent memory object in the sequence of memory objects.

15. The computer-implemented method of claim 14, wherein the sequence of memory objects is provided to an allocator to assign physical memory addresses to each memory object.

16. The computer-implemented method of claim 15, wherein the physical memory addresses assigned to a memory object span a rectangular section of memory in a memory array.

17. The computer-implemented method of claim 15, wherein the scheduled set of instructions is provided to a post-scheduler to rearrange the instructions.

18. The computer-implemented method of claim 15, wherein the physical memory addresses assigned to a memory object include ranges of memory addresses that are non-contiguous.

19. The computer-implemented method of claim 15, wherein the physical memory addresses assigned to a memory object correspond to a section of a state buffer that stores inputs to a systolic array.

20. The computer-implemented method of claim 15, wherein the physical memory addresses assigned to a memory object correspond to a section of a result buffer that stores outputs of a systolic array.

\* \* \* \* \*

UNITED STATES PATENT AND TRADEMARK OFFICE
CERTIFICATE OF CORRECTION

PATENT NO. : 11,625,269 B1
APPLICATION NO. : 17/301343
DATED : April 11, 2023
INVENTOR(S) : Robert Geva et al.

Page 1 of 1

It is certified that error appears in the above-identified patent and that said Letters Patent is hereby corrected as shown below:

In the Claims

Column 25, Line 14: change "The computing system computer-implemented method" to --The computing system--.

Signed and Sealed this
Nineteenth Day of September, 2023

Katherine Kelly Vidal
*Director of the United States Patent and Trademark Office*